United States Patent
Thooris et al.

(10) Patent No.: US 10,395,458 B2
(45) Date of Patent: Aug. 27, 2019

(54) SECURE VEHICLE ACCESS METHOD AND SYSTEM

(71) Applicant: Dura Operating, LLC, Auburn Hills, MI (US)

(72) Inventors: Arnaud Georges Thooris, Meudon (FR); Mickaël Roches, Saint Remy Les Chevreuse (FR)

(73) Assignee: Dura Operating, LLC, Auburn Hills, MI (US)

( * ) Notice: Subject to any disclaimer, the term of this patent is extended or adjusted under 35 U.S.C. 154(b) by 75 days.

(21) Appl. No.: 15/491,274

(22) Filed: Apr. 19, 2017

(65) Prior Publication Data

US 2017/0301167 A1 Oct. 19, 2017

(30) Foreign Application Priority Data

Apr. 19, 2016 (FR) ..................... 16 53459

(51) Int. Cl.
| | |
|---|---|
| *H04L 9/08* | (2006.01) |
| *G07C 9/00* | (2006.01) |
| *H04L 9/14* | (2006.01) |
| *H04L 9/30* | (2006.01) |
| *H04L 9/32* | (2006.01) |

(52) U.S. Cl.
CPC ..... *G07C 9/00309* (2013.01); *G07C 9/00571* (2013.01); *H04L 9/0822* (2013.01); *H04L 9/0861* (2013.01); *H04L 9/14* (2013.01); *H04L 9/3066* (2013.01); *H04L 9/3226* (2013.01); *G07C 2009/0088* (2013.01); *G07C 2009/00388* (2013.01); *G07C 2009/00412* (2013.01); *G07C 2009/00769* (2013.01)

(58) Field of Classification Search
CPC ............ G07C 9/00309; G07C 9/00571; G07C 2009/00412; G07C 2009/00388; G07C 2009/0088; G07C 2009/00769; H04L 9/3226; H04L 9/0822; H04L 9/0861; H04L 9/14; H04L 9/3066
USPC .......................................................... 380/281
See application file for complete search history.

(56) References Cited

U.S. PATENT DOCUMENTS

| | | |
|---|---|---|
| 2004/0064698 A1 | 4/2004 | Zhang |
| 2013/0259232 A1 | 10/2013 | Petel |
| 2014/0169564 A1 | 6/2014 | Gautama |

FOREIGN PATENT DOCUMENTS

| | | |
|---|---|---|
| EP | 1569482 A1 | 8/2005 |
| EP | 2743868 A1 | 6/2014 |
| WO | WO2014014945 A2 | 1/2014 |

OTHER PUBLICATIONS

French Search Report for French Serial No. 1653459 dated Dec. 16, 2016, 7 pages.

*Primary Examiner* — Mohammad W Reza
(74) *Attorney, Agent, or Firm* — Reising Ethington P.C.

(57) ABSTRACT

The present disclosure relates to a method and a system for securely accessing a vehicle. The method comprises a preliminary phase, a data exchange phase, and an access phase. The method implements the vehicle, a remote data server, and at least one personal electronic device supplied with a dedicated application. The method implements an elliptic encryption curve, a master key, a primary key, a secondary key, and a tertiary key.

17 Claims, 3 Drawing Sheets

SECURE VEHICLE ACCESS METHOD AND SYSTEM

CROSS REFERENCE TO RELATED APPLICATIONS

Figure 1:
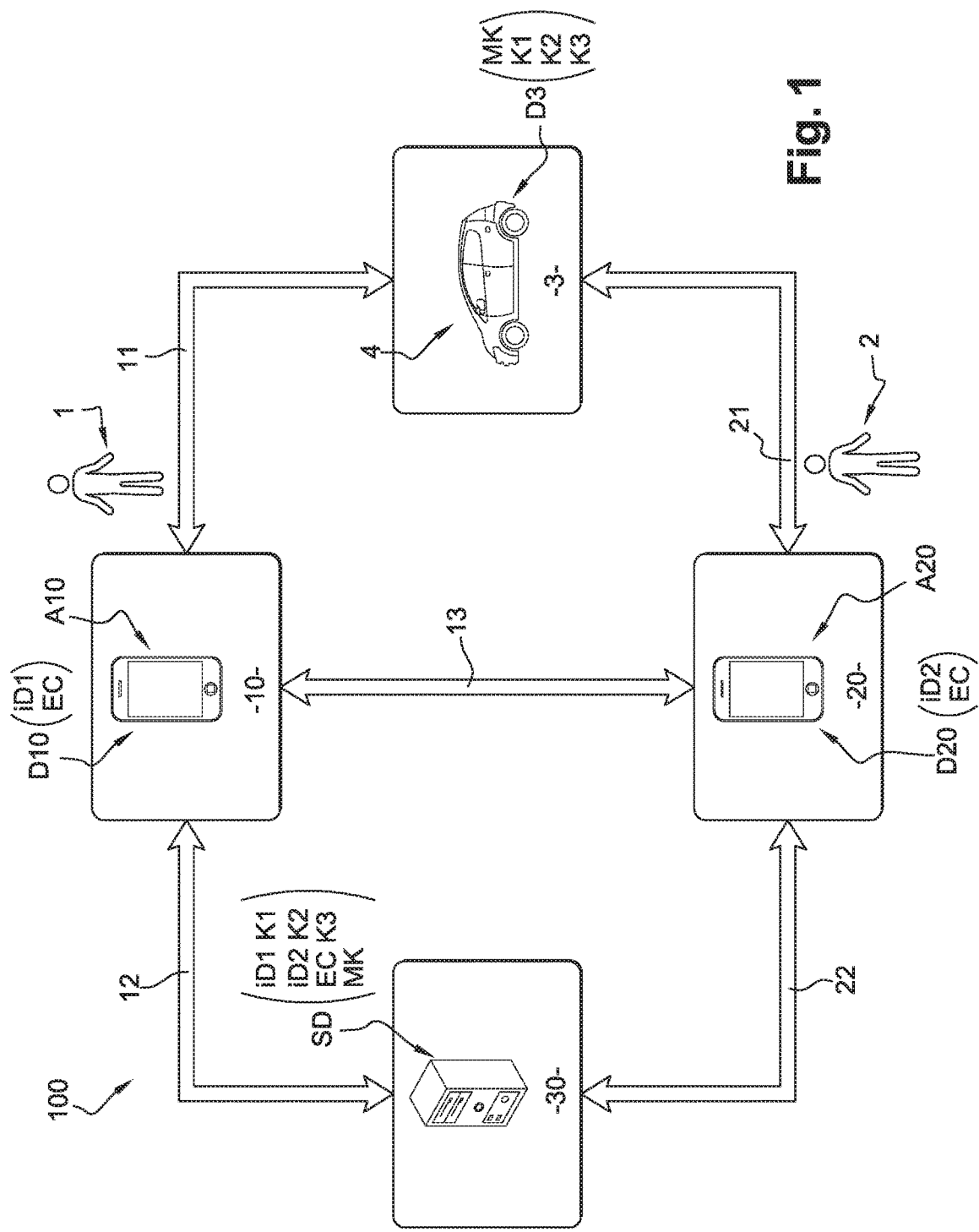

This application claims priority to French Patent Application No.: FR1653459 filed Apr. 19, 2016. The content of this priority application is incorporated herein by reference in its entirety.

TECHNICAL FIELD

The present disclosure relates to a method and a system for allowing access to a vehicle that can be used by different users. The disclosure also concerns a dedicated software application.

The technical field is automotive vehicles equipped with a keyless entry system.

BACKGROUND

In a known manner, such a keyless entry system is paired with an electronic card carried by a user of the vehicle. This card is configured in such a way as to establish a wireless link with the keyless entry system, authorizing the user to access the vehicle when the card is situated at a predetermined distance from the system.

Currently, the use of a mobile telephone as a replacement for an electronic card is known. A dedicated software application is installed on the telephone in such a way as to establish a wireless link with the keyless entry system. The number of electronic devices carried by the driver can thus be reduced.

In practice, several users can take turns borrowing and driving a single vehicle. To exchange an electronic card requires the users thereof to physically meet.

On the other hand, a physical meeting is not required in order to exchange a digital identification key with which to access the vehicle. Such an exchange can be performed, for example, by means of the mobile telephones of the users.

Access to vehicles is thus based more and more upon the wireless transmission of digital data, and less on the use of ancillary equipment such as a metal key.

Digital data exchanges must be as secure as possible in order to avoid their interception by an ill-intentioned third party.

One object of at least certain implementations of the present invention is to propose a secure automotive vehicle access method and system.

To this end, one object of at least certain implementations of the invention is a vehicle access method, comprising a preliminary phase that includes the following steps:

a1) provide the vehicle, which can be driven by different users, including a primary user and a secondary user, which is equipped with a keyless entry system, and which stores a master key, a primary key, a secondary key, and a tertiary key;

a2) provide a remote data server, which stores server data including identification information of the primary user, an elliptic encryption curve, the master key, the primary key, the secondary key and the tertiary key;

a3) provide a first personal device which belongs to the primary user, which includes an application that is configured to connect to the keyless entry system and which stores the identification information of the primary user and the elliptic encryption curve;

the access method subsequently comprises a data exchange phase including the following successive steps:

b1) the application installed on the first personal device sends the identification information of the primary user to the server;

b2) the server recognizes the identification information of the primary user;

b3) the server generates encrypted server data using the elliptic encryption curve for the encryption, the encrypted server data including the secondary key, the tertiary key, and an encrypted master key using the primary key for the encryption.

b4) the server sends the encrypted server data to the first personal device;

b5) the first personal device uses the elliptic encryption curve to decrypt the encrypted server data, such that the first personal device stores the secondary key, the tertiary key, and the encrypted master key;

the access method subsequently comprises an access phase including the following successive steps:

c1) the application installed on the first personal device establishes a secure connection with the vehicle, implementing the tertiary key;

c2) if the secure connection procedure is successful, the application installed on the first personal device transmits the encrypted master key to the vehicle;

c3) the vehicle uses the primary key to decrypt the encrypted master key;

c4) after decryption, the vehicle recognizes the master key and controls the keyless entry system, such that the primary user can access the vehicle using the application installed on the first personal device.

One object of at least certain implementations of the invention is also a vehicle access method, comprising a preliminary phase that includes the following steps:

a1) provide the vehicle, which can be driven by different users, including a primary user and a secondary user, which is equipped with a keyless entry system, and which stores a master key, a primary key, a secondary key, and a tertiary key;

a2) provide a remote data server, which stores server data including identification information of the primary user, an elliptic encryption curve, the master key, the primary key, the secondary key and the tertiary key;

a3) provide a first personal device which belongs to the primary user, which includes an application that is configured to connect to the keyless entry system and which stores the identification information of the primary user and the elliptic encryption curve;

a4) provide a second personal device which belongs to the secondary user, which includes an application that is configured to connect to the keyless entry system and which stores the identification information of the secondary user and the elliptic encryption curve;

the access method subsequently comprises a data exchange phase including the following successive steps:

b1) the application installed on the first personal device sends the identification information of the primary user to the server;

b2) the server recognizes the identification information of the primary user;

b3) the server generates encrypted server data using the elliptic encryption curve for the encryption, the encrypted server data including the secondary key, the tertiary key, and an encrypted master key using the primary key for the encryption.

b4) the server sends the encrypted server data to the first personal device;

b5) the first personal device uses the elliptic encryption curve to decrypt the encrypted server data, such that the first personal device stores the secondary key, the tertiary key, and the encrypted master key;

b6) the application installed on the second personal device sends the identification information of the secondary user to the application installed on the first personal device;

b7) the primary user agrees to lend the vehicle to the secondary user;

b8) the application installed on the first personal device generates access data, including the encrypted master key;

b9) the application installed on the first personal device generates encrypted access data using the secondary key for the encryption;

b10) the application installed on the first personal device generates encrypted mobile data using the elliptic encryption curve for the encryption, the encrypted mobile data including the tertiary key, and the encrypted access data;

b11) the application installed on the first personal device transmits the encrypted mobile data to the application installed on the second personal device;

b12) the application installed on the second personal device uses the elliptic encryption curve to decrypt the encrypted mobile data, such that the second personal device stores the tertiary key, and the encrypted access data;

the access method subsequently comprises an access phase including the following successive steps:

d1) the application installed on the second personal device establishes a secure connection with the vehicle, implementing the tertiary key;

d2) if the secure connection procedure is successful, the application installed on the second personal device transmits the encrypted access data to the vehicle;

d3) the vehicle uses the secondary key to decrypt the encrypted access data;

d4) after decryption, the vehicle recognizes the access data and controls the keyless entry system, such that the secondary user can access the vehicle using the application installed on the second personal device.

The access method thus allows for the practical, effective and secure exchange of data regarding the vehicle. The encryption and digital data transfer operations are conducted by means of a dedicated application running on a personal electronic device, such as a mobile telephone. With at least some implementations of the invention, said exchanges can be automated without users having to worry about the complexity thereof. The user interface displayed on the personal electronic device is simple and intuitive.

Other advantageous characteristics of at least certain implementations of the invention, taken separately or in combination, will appear upon reading the following description.

SUMMARY

According to preferred characteristics, regardless of the embodiment:

In step b1), the primary user identification information includes an e-mail address, a name and/or a telephone number.

The master key defined for the vehicle is assigned to the primary user and is changed when the vehicle is associated with a new primary user.

The elliptic encryption curve is a Diffie-Hellman elliptic curve.

According to various possible characteristics, in the embodiment where the secondary user has access to the vehicle:

Step b7) is performed manually by the primary user using the application installed on the first personal device.

In step b7), the primary user defines conditions for accessing the vehicle, for example an established period of time, and in step b8), the access data include, on the one hand, the encrypted master key using the primary key for the encryption and on the other hand, the predefined access conditions.

In step b6), the secondary user identification information includes an e-mail address, a name and/or a telephone number.

The application installed on the second personal device is configured to connect to the server, under certain conditions.

Preferably, the first personal electronic device is a mobile telephone. Alternatively, the first personal electronic device is an electronic watch, a digital tablet or a passive entry card.

Likewise, preferably, the second personal electronic device is a mobile telephone. Alternatively, the second personal electronic device is an electronic watch, a digital tablet or a passive entry card.

An object of at least some implementations of the invention is also a vehicle access system comprising:

the vehicle, which can be driven by different users, including a primary user and a secondary user, which is equipped with a keyless entry system, and which stores a master key, a primary key, a secondary key, and a tertiary key;

provide a remote data server, which stores server data including identification information of the primary user, an elliptic encryption curve, the master key, the primary key, the secondary key and the tertiary key; and a first personal device which belongs to the primary user, which includes an application that is configured to connect to the keyless entry system and to the server, and which stores the elliptic encryption curve and the identification information of the primary user;

wherein the vehicle, the server and the first personal device are configured in such a way as to implement the access method defined above, allowing the primary user to access the vehicle.

According to a specific embodiment, the access system comprises a second personal device which belongs to the secondary user, which includes an application that is configured to connect to the keyless entry system and which stores the identification information of the secondary user and the elliptic encryption curve. The vehicle, the server, the first personal device and the second personal device are configured in such a way as to implement the access method defined above, allowing the secondary user to access the vehicle.

An object of at least certain implementations of the invention is also a software application that is configured in such a way as to be installed and running on a personal electronic device, the application comprises portions of code in order to implement the steps of the access method defined above, when the application is running on the personal electronic device.

BRIEF DESCRIPTION OF THE ACCOMPANYING DRAWINGS

Figure 2:
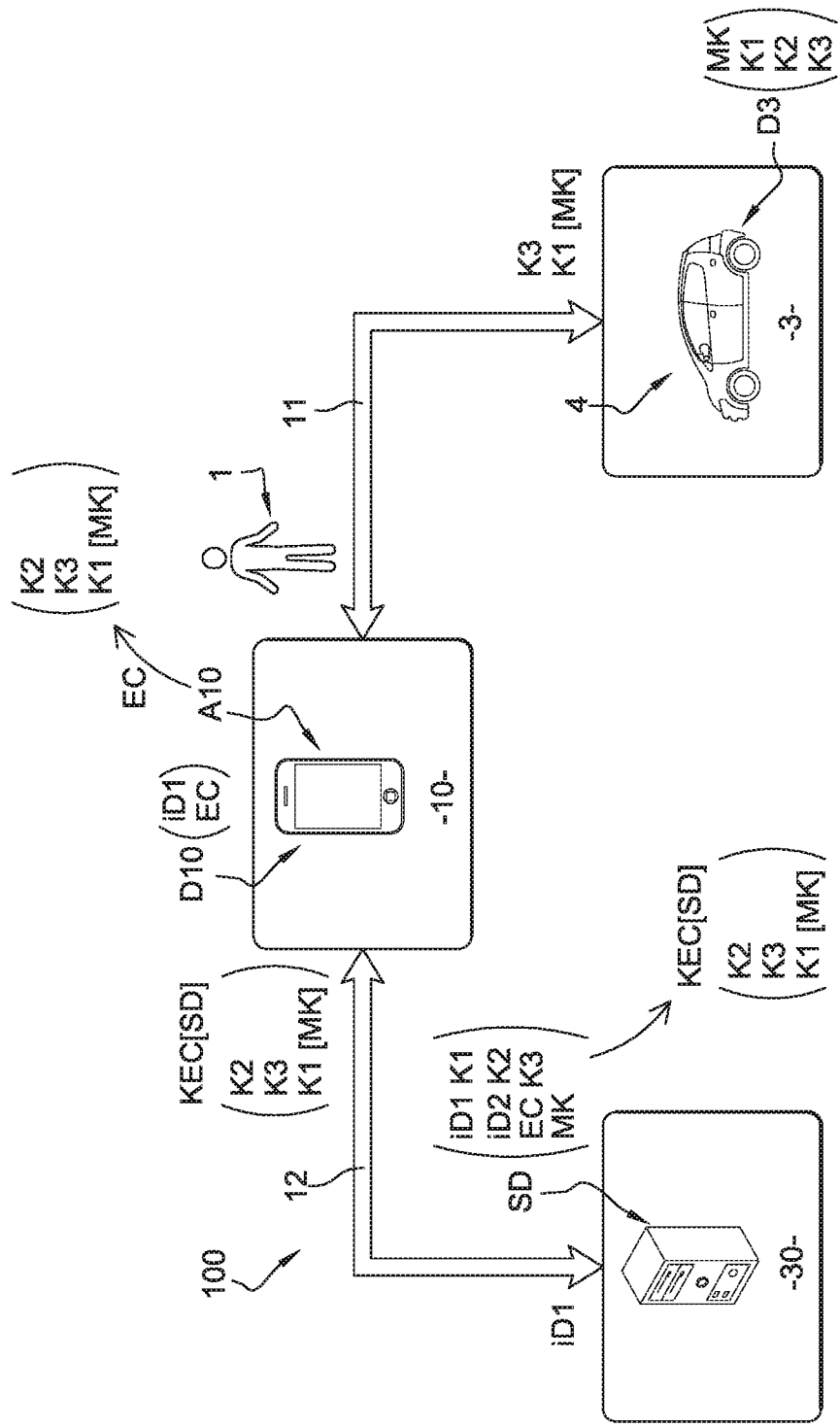
Figure 3:
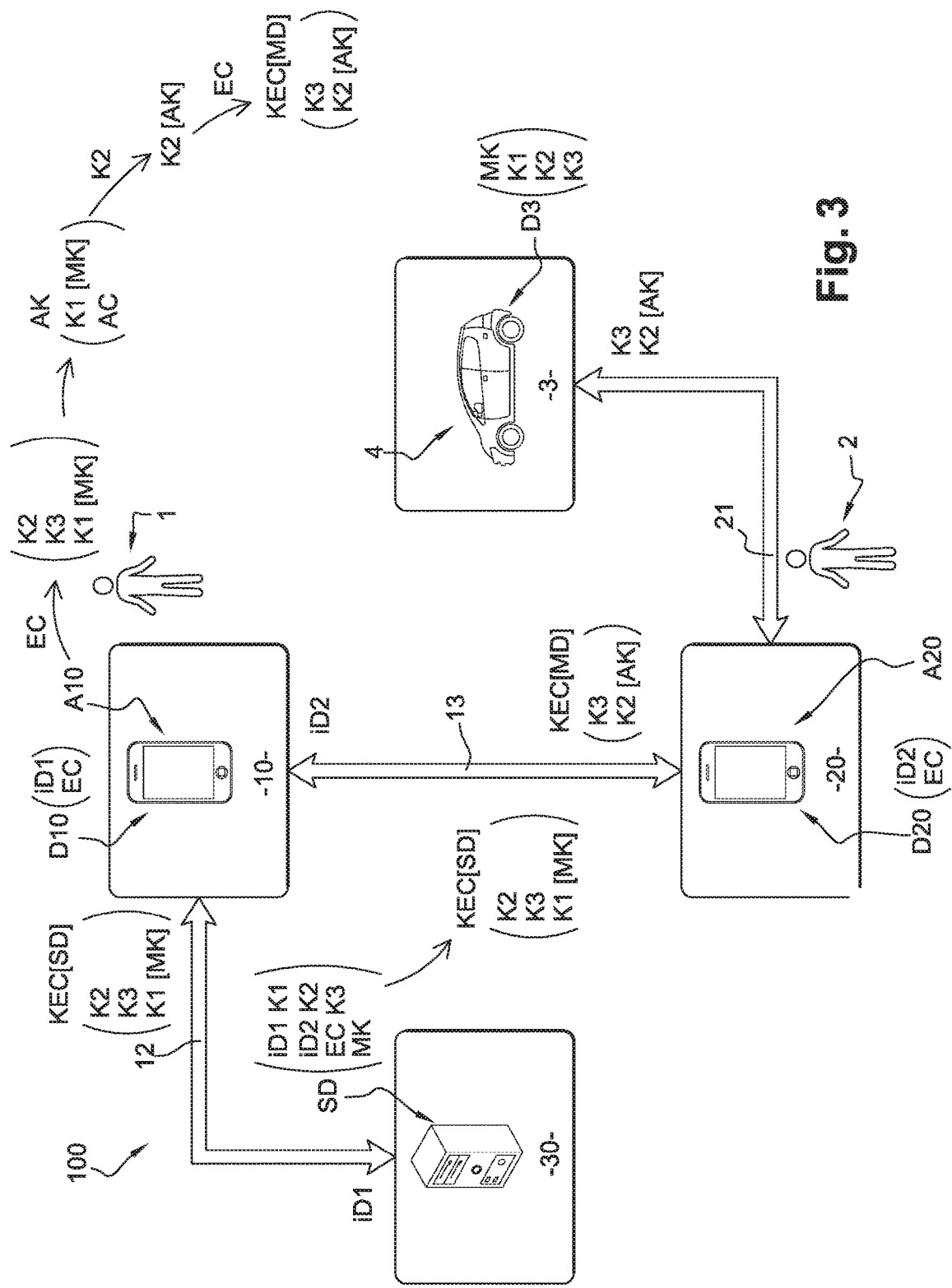

The invention will be better understood upon reading the following description, given solely as a non-limiting example, and made with reference to the accompanying figures wherein:

FIG. 1 is a schematic representation of a data exchange system according to an implementation of the invention;

FIG. 2 is a schematic representation similar to FIG. 1, illustrating a first embodiment of the data exchange method according to an implementation of the invention, allowing a primary user to have access to the vehicle; and FIG. 3 is a schematic representation similar to FIG. 1, illustrating a second embodiment of the data exchange method according to an implementation of the invention, allowing a secondary user to have access to the vehicle.

DETAILED DESCRIPTION

In FIG. 1, the data exchange system 100 includes an automotive vehicle 3, a first mobile telephone 10, a second mobile telephone, 20, and a remote data server 30.

The vehicle 3 is designed to be driven by a user who is then the driver. The vehicle 3 is alternately drivable by various users, including a primary user 1 and a secondary user 2.

Generally, the primary user 1 is the owner of the vehicle 3 whereas the secondary user 2 is a colleague, friend or family member of the primary user 1. The telephone 10 belongs to user 1, whereas the telephone 20 belongs to user 2.

The vehicle 3 is equipped with a keyless entry system 4. The system 4 can be used to automatically open and close openings of the vehicle 3 by user 1 or 2 without inserting a key into a lock. The openings include the doors and trunk of the vehicle 3.

In at least some implementations, the present invention implements various digital data entries, listed in Table 1 below:

TABLE 1

| Reference | Data implemented<br>Explanation |
|---|---|
| D3 | Data stored in the vehicle 3 |
| D10 | Data stored in the telephone 10 |
| D20 | Data stored in the telephone 20 |
| SD | Data stored on the server 30 |
| EC | Elliptic encryption curve (preferably a Diffie-Hellman elliptic curve) |
| ID1 | Primary user 1 identification information (e-mail address, name and/or telephone number of the primary user 1) |
| ID2 | Secondary user 2 identification information (e-mail address, name and/or telephone number of the secondary user 2) |
| K1 | Primary key (encryption key) |
| K2 | Secondary key (encryption key) |
| K3 | Tertiary key (identification key allowing the telephone 10 or 20 to establish a connection with the vehicle 3) |
| MK | Master key (identification key allowing access to the vehicle 3) |

In at least some implementations, the present invention also implements various wireless communication links, listed in Table 2 below:

TABLE 2

| Reference | Wireless communication links<br>Explanation |
|---|---|
| 11 | Communication between the telephone 10 and the vehicle 3 |
| 12 | Communication between the telephone 10 and the server 30 |
| 13 | Communication between the telephones 10 and 20 |
| 21 | Communication between the telephone 20 and the vehicle 3 |
| 22 | Communication between the telephone 20 and the server 30 |

Preferably the communication links 11 and 21 use an NFC standard ("Near Field Communication") and/or a Bluetooth standard.

The wireless communication links 12 and 22 preferably use a Wi-Fi, LTE, or any other advanced mobile standard.

The communication link 13 uses a GSM, LTE, or any other mobile standard. The communication link 13 can be directly established between the telephones 10 and 20, by means of a cloud.

Various digital data entries D3 are securely stored within the vehicle 3, for example within the central control unit of the vehicle 3 and/or within the system 4. The data D3 include the master key MK, the primary key K1, the secondary key K2 and the tertiary key K3.

The telephones 10 and 20 are smartphones configured in such a way as to communicate by means of various wireless communications standards (in particular LTE, NFC, Bluetooth, Wi-Fi, etc.) and for running various applications. Each of the telephones 10 and 20 constitutes a personal electronic device, which is carried by the respective user 1 or 2.

As part of at least certain implementations of the invention, the telephones 10 and 20 can connect to the keyless entry system 4 of the vehicle 3 by means of a dedicated application, under certain conditions detailed below. The application carries the reference A10 on telephone 10 and A20 on telephone 20; it is understood that the same software application is involved.

The key K3 is a primary identification key associated with the vehicle 3, more specifically with the system 4. Once received in encrypted form by the telephone 10 from the server 30, the key K3 authorizes a telephone connection 10 by means of the wireless link 11. In the same way, once received in encrypted form by the telephone 20, the key K3 authorizes a telephone connection 20 to the system 4 by means of the wireless link 21.

The key K3 is a primary identification key associated with the vehicle 3, more specifically with the system 4. The master key MK is attributed to the primary user 1, for example during the purchase or rental of the vehicle 3. The key MK is changed when the vehicle 3 is assigned to a new primary user, for example when the vehicle 3 is sold to a new owner or leased to a new lessee.

Once the key MK is received in encrypted form by the telephone 10 from the server 30, and if the communication link 11 is established using the key K3, then the key MK authorizes access by the telephone 10 to the system 4 by means of the wireless link 11. Once the key MK is received in encrypted form by the telephone 20 from the server 10, and if the communication link 21 is established using the key K3, then the key MK authorizes access by the telephone 20 to the system 4 by means of the wireless link 21. Thus, by means of the system 4, the user 1 or 2 can control the opening and closing of the doors of the vehicle 3.

Initially, the keys K3 and MK are securely stored in the vehicle 3 and on the server 30.

After the installation of the application A10 on the telephone 10:
- the telephone 10 can establish a wireless link 12 with the server 30;
- the primary user 1 identification information ID1 is stored on the server 30;
- the elliptic encryption curve EC is downloaded to the telephone 10 from the server 30;
- the data D10 stored securely on the telephone 10 then include the primary user 1 identification information ID1 and the elliptic encryption curve EC;
- without the keys K3 and MK, the telephone 10 cannot yet access the vehicle 3 by means of the wireless link 11.

In the same way, after the installation of the application A20 on the telephone 20:
- the telephone 20 can establish a wireless link 22 with the server 30;
- the secondary user 2 identification information ID2 is stored on the server 30;
- the elliptic encryption curve EC is downloaded to the telephone 20 from the server 30;
- the data D20 stored securely on the telephone 20 then include the secondary user 2 identification information ID2 and the elliptic encryption curve EC;
- without the keys K3 and MK, the telephone 20 cannot yet access the vehicle 3 by means of the wireless link 21.

The server 30 is dedicated to securely storing server data SD relating, on the one hand, to the vehicle 3 and, on the other hand, to the telephones 10 and 20 configured in such a way as to connect to the vehicle 3. The data SD includes the elliptic encryption curve EC, the master key MK, the primary key K1, the secondary key K2, and the tertiary key K3. After the installation of the applications A10 and A20 on the telephones 10 and 20, the data SD also include the information ID1 and ID2.

In practice, the system 100 can be configured differently from FIG. 1 without departing from the scope of the invention.

As a variant, the telephone 10 and/or 20 can be replaced by an electronic watch, a digital tablet or a passive entry card thus forming the personal electronic device having the characteristics described above for the telephone 10. Other personal electronic devices can be implemented without departing from the scope of the invention.

According to another variant, the system 100 can comprise more than two personal electronic devices 10 and 20 that are associated with the system 4 equipping the vehicle 3.

According to another variant, the system 100 can comprise several vehicles 3 equipped with keyless entry systems 4 that are associated with the same telephone 10.

The access method according to at least certain implementations of the invention is detailed below with reference to FIGS. 2 and 3.

FIG. 2 illustrates the first embodiment, consisting in giving access to the vehicle 3 to the primary user 1, while FIG. 3 illustrates the second embodiment, consisting in giving access to the vehicle 3 to the primary user 1.

Regardless of the embodiment, the access method comprises a preliminary phase, a data exchange phase, and an access phase.

The preliminary phase comprises the steps a1), a2), and a3), consisting in providing the vehicle 3, the server 30, and the telephone 10.

In the second embodiment, the preliminary phase comprises a further step a4), consisting in providing the telephone 20.

At this step, the applications A10 and A20 are installed on the telephones 10 and 20.

The data exchange phase comprises the following steps b1), b2), b3), b4), and b5).

In step b1), the application A10 sends a request to the server 30, accompanied by the information ID1.

In step b2), the server 30 recognizes the information ID1 and authorizes the execution of the query. In step b3), the server 30 encrypts the master key MK using the primary key K1 for the encryption. The server 30 then generates encrypted server data KEC[SD] using the elliptic encryption curve EC for the encryption. The encrypted server data KEC[SD] include the secondary key K2, the tertiary key K3, and the encrypted master key K1 [MK].

In step b4), the server 30 sends the encrypted server data KEC[SD] to the telephone 10. In step b5), the application A10 installed on the telephone 10 uses the elliptic curve EC to decrypt the encrypted server data KEC[SD]. At this stage, the data D10 stored on the telephone 10 include the secondary key K2, the tertiary key K3, and the encrypted master key K1[MK]. However, the data D10 do not include the key K1, such that the application A20 cannot decrypt the encrypted master key K1[MK].

In the first embodiment, the step b5) is followed by the phase wherein the user 1 accesses the vehicle 3. The access phase comprises the following steps c1), c2), c3), and c4).

In step c1), the application A10 establishes a secure connection with the vehicle 3 by means of the communication link 11, implementing the tertiary key K3. Preferably, the communication link 11 is automatically established when the telephone 10 is at a predetermined distance from the system 4 and has the initialization parameters downloaded from the server 30, including the key K3.

In step c2), if the secure connection procedure is successful, the application A10 transmits the encrypted master key K1 [MK] to the vehicle 3.

In step c3), the vehicle 3 uses the primary key K1 to decrypt the encrypted master key K1 [MK];

In step c4), after decryption, the vehicle recognizes the master key MK and controls the keyless entry system, such that the primary user 1 can access the vehicle using the application A10.

Thus, the invention allows the user 1 to securely access the vehicle 3.

In the second embodiment, after step b5), the data exchange phase further includes the following steps b6), b7), b8), b9), b10), b11), and b12).

In step b6), the application A20 sends a request to the application A10, accompanied by the information ID2.

In step b7), the primary user 1 agrees to lend the vehicle 3 to the secondary user 2. Preferably, this step b7) is performed manually by the user 1 using the application A10. For example, the request sent by the application appears on the application A10, and the user 1 presses 'accept' or 'decline'. If the user 1 does not lend the vehicle 3 to the user 2, then the data exchange phase is interrupted. Advantageously in step b7), the primary user 1 can define access conditions AC, for example a period of time within which the user 2 can access the vehicle 3.

In step b8), the application A10 generates access data AK, including the encrypted master key K1 [MK]. If the user 1 has defined access conditions AC in step b7), then the access data AK include the encrypted master key K1 [MK] and the predefined access conditions AC.

In step b9), the application A10 generates encrypted access data K2[AK], using the secondary key K2 for the encryption.

In step b10), the application A10 generates encrypted mobile data KEC[MD], using the elliptic encryption curve EC for the encryption. The encrypted mobile data KEC[MD] include the tertiary key K3 and the encrypted access key K2[AK].

In step b11), the application A10 transmits the encrypted mobile data KEC[MD] to the application A20.

In step b12), the application A20 uses the elliptic curve EC to decrypt the encrypted mobile data KEC[SD]. At this stage, the data D20 stored on the telephone 20 include the tertiary key K3, and the encrypted access data K2[AK]. However, the data D20 do not include the key K2, such that the application A20 cannot decrypt the encrypted access data K2[AK].

In the second embodiment, the step b12) is followed by the access phase wherein the user 2 accesses the vehicle 3. The access phase comprises the following steps d1), d2), d3), and d4).

In step d1), the application A20 establishes a secure connection with the vehicle 3 by means of the communication link 21, implementing the tertiary key K3. Preferably, the communication link 21 is automatically established when the telephone 20 is at a predetermined distance from the system 4 and has the initialization parameters downloaded from the server 10, including the key K3. In step d2), if the secure connection procedure is successful, the application A20 transmits the encrypted access data K2[AK] to the vehicle 3.

In step d3), the vehicle 3 uses the secondary key K2 to decrypt the encrypted access data K2[AK];

In step d4), after decryption, the vehicle 3 recognizes the access data AK, including the encrypted master key K1[MK] and the access conditions AC. The vehicle 3 uses the primary key K1 to decrypt the encrypted master key K1[MK]; The vehicle 3 then controls the keyless entry system 4, such that the secondary user 2 can access the vehicle using the application A20.

Thus, the invention allows the user 1 to securely authorize user 2 to access the vehicle 3, user 2 is subsequently authorized to securely access the vehicle 3.

In practice, the technical characteristics of the various embodiments mentioned above can, as a whole or in part, be combined with each other.

Thus, the method and the system 100 for secure access to vehicle 3 can be adapted in terms of cost, ergonomics, functionality, and performance.

The invention claimed is:

1. A vehicle access method
for a vehicle which can be driven by different users, including a primary user and a secondary user, which is equipped with a keyless entry system, and which stores a master key, a primary key, a secondary key, and a tertiary key, and
a remote data server, which stores server data including identification information of the primary user, an elliptic encryption curve, the master key, the primary key, the secondary key and the tertiary, and
a first personal device which belongs to the primary user, which includes an application that is configured to connect to the keyless entry system and to the server, and which stores the identification information of the primary user and the elliptic encryption curve,
the access method comprises a data exchange phase including the following successive steps:
b1) sending the identification information of the primary user to the server via the application installed on the first personal device;
b2) receiving at the first personal device from the server encrypted server data using the elliptic encryption curve for the encryption, the encrypted server data including the secondary key, the tertiary key, and an encrypted master key using the primary key for the encryption,
the first personal device being configured to use the elliptic encryption curve to decrypt the encrypted server data, such that the first personal device stores the secondary key, the tertiary key, and the encrypted master key;
the access method subsequently comprises an access phase including the following successive steps:
c1) establishing at the vehicle a secure connection of the first personal device with the vehicle, implementing the tertiary key provided by the first personal device;
c2) if the secure connection procedure is successful, sending the encrypted master key to the vehicle from the first personal device
wherein the vehicle is configured to decrypt the encrypted master key using the primary key, and
after decryption, the vehicle is configured to control the keyless entry system such that the primary user can access the vehicle using the application installed on the first personal device.

2. The vehicle access method of claim 1, which also comprises:
b3) receiving via the application installed on the first personal device identification information of a secondary user;
b4) generating via the application installed on the first personal device access data, including the encrypted master key;
b5) generating via the application installed on the first personal device encrypted access data, using the secondary key for the encryption;
b6) generating via the application installed on the first personal device encrypted mobile data using the elliptic encryption curve for the encryption, the encrypted mobile data including the tertiary key, and the encrypted access data;
b7) transmitting from the application installed on the first personal device the encrypted mobile data to the application installed on the second personal device which is configured to use
the elliptic encryption curve to decrypt the encrypted mobile data, such that the second personal device stores the tertiary key, and the encrypted access data and to establish
a secure connection with the vehicle, implementing the tertiary key and to transmit the encrypted access data to the vehicle which is configured to use
the secondary key to decrypt the encrypted access data and
after decryption, the vehicle is configured to recognize the access data and controls the keyless entry system, such that the secondary user can access the vehicle using the application installed on the second personal device.

3. Access method according to claim 2, wherein step b4) occurs after the primary user uses the application installed on the first personal device to agree to lend the vehicle to the secondary user.

4. Access method according to claim 2, prior to step b4), the primary user defines conditions for accessing the vehicle and in that in step b4) the access data include, on the one hand, the encrypted master key using the primary key for the encryption and on the other hand, the predefined access conditions.

5. Access method according to claim 2, characterized in that in step b3), the identification information of the secondary user include an email address, a name and/or a telephone number.

6. Access method according to claim 2, characterized in that the application installed on the second personal device is configured to connect to the server, under certain conditions.

7. Access method according to claim 2, characterized in that the second personal device is a mobile telephone.

8. Access method according to claim 2, characterized in that the second personal device is an electronic watch, a digital tablet, or a passive entry card.

9. Access method according to claim 1, characterized in that the first personal device is a mobile telephone.

10. Access method according to claim 1, characterized in that the first personal device is an electronic watch, a digital tablet, or a passive entry card.

11. Access method according to claim 1, characterized in that in step b1), the identification information of the primary user include an email address, a name and/or a telephone number.

12. Access method according to claim 1, characterized in that the master key defined for the vehicle is attributed to the primary user and is modified when the vehicle is associated with a new primary user.

13. Access method according to claim 1, characterized in that the elliptic encryption curve is a Diffie-Hellman elliptic curve.

14. A vehicle access method for a vehicle which can be driven by different users, including a primary user and a secondary user, which is equipped with a keyless entry system, and which stores a master key, a primary key, a secondary key, and a tertiary key, and a remote data server, which stores server data including identification information of the primary user, an elliptic encryption curve, the master key, the primary key, the secondary key and the tertiary key, and a first personal device which belongs to the primary user, which includes an application that is configured to connect to the keyless entry system and to the server, and which stores the identification information of the primary user and the elliptic encryption curve, the access method comprises a data exchange phase including the following successive steps:
- b1) sending the identification information of the primary user to the server via the application installed on the first personal device;
- b2) receiving at the server the identification information of the primary user sent from the application installed on the first personal device;
- b3) generating via the server encrypted server data using the elliptic encryption curve for the encryption, the encrypted server data including the secondary key, the tertiary key, and an encrypted master key using the primary key for the encryption;
- b4) sending the encrypted server data to the first personal device which is configured to use the elliptic encryption curve to decrypt the encrypted server data, such that the first personal device stores the secondary key, the tertiary key, and the encrypted master key;

the access method subsequently comprises an access phase including the following successive steps:
- c1) establishing a secure connection via the first personal device with the vehicle, implementing the tertiary key;
- c2) sending to the vehicle from the first personal device the encrypted master key to the vehicle wherein the vehicle is configured to decrypt the encrypted master key using the primary key and after decryption, control the keyless entry system such that the primary user can access the vehicle using the application installed on the first personal device.

15. The method of claim 14, which also comprises:
- b5) receiving via the application installed on the first personal device identification information of a secondary user;
- b6) generating via the application installed on the first personal device access data, including the encrypted master key;
- b7) generating via the application installed on the first personal device encrypted access data, using the secondary key for the encryption;
- b8) generating via the application installed on the first personal device encrypted mobile data using the elliptic encryption curve for the encryption, the encrypted mobile data including the tertiary key, and the encrypted access data;
- b9) transmitting from the application installed on the first personal device the encrypted mobile data to an application installed on the second personal device which is configured to use the elliptic encryption curve to decrypt the encrypted mobile data, such that the second personal device stores the tertiary key, and the encrypted access data and to establish a secure connection with the vehicle, implementing the tertiary key and to transmit the encrypted access data to the vehicle which is configured to use the secondary key to decrypt the encrypted access data and after decryption, the vehicle is configured to recognize the access data and controls the keyless entry system, such that the secondary user can access the vehicle using the application installed on the second personal device.

16. A vehicle access method for a vehicle which can be driven by different users, including a primary user and a secondary user, which is equipped with a keyless entry system, and which stores a master key, a primary key, a secondary key, and a tertiary key, and a remote data server, which stores server data including identification information of the primary user, an elliptic encryption curve, the master key, the primary key, the secondary key and the tertiary key, and a first personal device which belongs to the primary user, which includes an application that is configured to connect to the keyless entry system and to the server, and which stores the identification information of the primary user and the elliptic encryption curve, the access method comprises a data exchange phase including the following successive steps:
- b1) sending the identification information of the primary user to the server via the application installed on the first personal device;
- b2) receiving at the first personal device encrypted server data from the server, where the encrypted server data includes the secondary key, the tertiary key, and an encrypted master key using the primary key for the encryption;
- b3) decrypting the encrypted server data via the first personal device using the elliptic encryption curve, such that the first personal device stores the secondary key, the tertiary key, and the encrypted master key;

the access method subsequently comprises an access phase including the following successive steps:

c1) establishing a secure connection via the first personal device with the vehicle, implementing the tertiary key;
c2) sending to the vehicle from the first personal device the encrypted master key to the vehicle;
c3) decrypting the encrypted master key at or by the vehicle using the primary key; and
c4) controlling the keyless entry system such that the primary user can access the vehicle using the application installed on the first personal device.

17. The method of claim 16, which also comprises:
b4) receiving via the application installed on the first personal device identification information of a secondary user;
b5) generating via the application installed on the first personal device access data, including the encrypted master key;
b6) generating via the application installed on the first personal device encrypted access data, using the secondary key for the encryption;
b7) generating via the application installed on the first personal device encrypted mobile data using the elliptic encryption curve for the encryption, the encrypted mobile data including the tertiary key, and the encrypted access data;
b8) transmitting from the application installed on the first personal device the encrypted mobile data to an application installed on the second personal device which is configured to use the elliptic encryption curve to decrypt the encrypted mobile data, such that the second personal device stores the tertiary key, and the encrypted access data and to establish a secure connection with the vehicle, implementing the tertiary key and to transmit the encrypted access data to the vehicle which is configured to use the secondary key to decrypt the encrypted access data and after decryption, the vehicle is configured to recognize the access data and controls the keyless entry system, such that the secondary user can access the vehicle using the application installed on the second personal device.

* * * * *